United States Patent [19]

Ligon, Jr. et al.

[11] 4,110,612

[45] Aug. 29, 1978

[54] MASS SPECTROMETER DESORPTION DEVICE INCLUDING FIELD ANODE EUTECTIC ALLOY WIRE AND AUXILIARY ELECTRICAL RESISTANCE HEATING MEANS

[75] Inventors: Woodfin V. Ligon, Jr., Schenectady; Eric Lifshin, Loudonville, both of N.Y.

[73] Assignee: General Electric Company, Schenectady, N.Y.

[21] Appl. No.: 791,569

[22] Filed: Apr. 27, 1977

[51] Int. Cl.[2] .............................................. B01D 59/44

[52] U.S. Cl. ................................ 250/281; 250/492 R; 313/351

[58] Field of Search ............................... 313/351, 309; 250/492 R, 281; 204/39

[56] References Cited

U.S. PATENT DOCUMENTS

| | | | |
|---|---|---|---|
| 3,720,856 | 3/1973 | Brody | 313/351 |
| 3,745,402 | 7/1973 | Shelton et al. | 313/351 |
| 4,038,158 | 7/1977 | Bursey et al. | 204/39 |

*Primary Examiner*—Harold A. Dixon
*Attorney, Agent, or Firm*—Charles T. Watts; Joseph T. Cohen

[57] ABSTRACT

This mass spectrometer field desorption device has a field anode in the form of a directionally solidified alloy eutectic wire of relatively large active surface and includes electrical resistance heating element to heat the field anode and thereby improve field desorption performance.

10 Claims, 7 Drawing Figures

MASS SPECTROMETER DESORPTION DEVICE INCLUDING FIELD ANODE EUTECTIC ALLOY WIRE AND AUXILIARY ELECTRICAL RESISTANCE HEATING MEANS

This invention relates generally to field desorption mass spectrometry and is more particularly concerned with a novel field desorption device which in the over-all combination structure affords new and important advantages in mass spectrometer operation.

BACKGROUND OF THE INVENTION

In field desorption mass spectrometry, a positive ion beam is generated in a mass spectrometer by causing electrons to tunnel to the emitting point while positive ions are ejected from the emitter along field lines into the optical system of the mass spectrometer. Molecules of sample material applied to the emitter may thus be analyzed even though they may be of very low vapor pressure and very high molecular weight. To maximize the emitter efficiency, a large number of uniformly-spaced points of approximately equal height above the emitter substrate are necessary. Additionally, to facilitate cleaning, the emitter should be thermally stable to relatively high temperature.

Heretofore, the best emitters have been provided by vapor-depositing carbon dendrites on a tungsten substrate. However, these devices are inherently fragile, have relatively short useful lives, tend to adhere to sample materials, and because of random orientation of the dendrites have non-uniform field gradients and limited heat transport to active emitter points.

SUMMARY OF THE INVENTION

We have found that by departing from the prior art practice based on the use of dendrites of carbon, nickel and the like, the foregoing shortcomings of the emitter devices can be avoided. We have further found that certain eutectic materials can be used to provide field desorption anodes which perform the emitter function as well as the best prior art devices of this type. Still further, we have found that such new field desorption anodes or emitters can be mass produced with consistency and without economic penalty compared to the heretofore available dendrite-type devices.

In accordance with our invention, therefore, the field anode of a mass spectrometer field desorption device is provided in the form of a wire of directionally-solidified eutectic alloy which is comprised of at least two phases in the solid state. One of the phases is alloy metal matrix, and the second phase is rod-like in form and each individual rod of metal carbide or similar eutectic material is exposed to a limited extent as it projects from the alloy metal matrix on the upper or emitting side of the anode. The rods comprising this second phase are substantially parallel to each other and of approximately the same exposed lengths and additionally are of substantially uniform diameter from 1,000 Angstroms to 10 microns and of population density from $10^9$ to $10^{10}$ rods per square centimeter. The combination structure of this invention includes, in addition to this new field desorption emitter, a field emitter insertion rod, a field ion emitter carrier affixed to the end of the insertion rod and comprising a base and two spaced electrodes projecting from the base, and conductor means to connect the carrier electrodes with an electric power source. The field desorption emitter then bridges between and is electrically coupled to one or both of the free ends of the emitter electrode, as will be described in greater detail. In use, this combination field desorption device is assembled with a mass spectrometer analyzer apparatus so that the ion beam generated by the tips of the second phase rods will direct positive ions into the optical system of the mass spectrometer.

Additionally, in accordance with our invention the field anode is formed so as to concentrate the power output of the ion beam. This is accomplished by shaping the anode wire with a knife edge on its upper side, or at least with a truncated knife edge, and then etching matrix metal away to expose the second phase rods to the extent desired. As a further improvement, the resulting wire body may be subjected to ultrasonic energy discharge to shatter the exposed rods, leaving stumps with sharp splintered ends, and then again exposing the wire to etchant solution to remove still more matrix metal and lengthen the exposed portions of the rods. The latter, in fact, is a succinct of the method of our present invention which is illustrated in the drawings in the form of the end product and is set out in procedural detail hereinbelow.

THE DRAWINGS

DETAILED DESCRIPTION OF THE INVENTION

Figure 1:
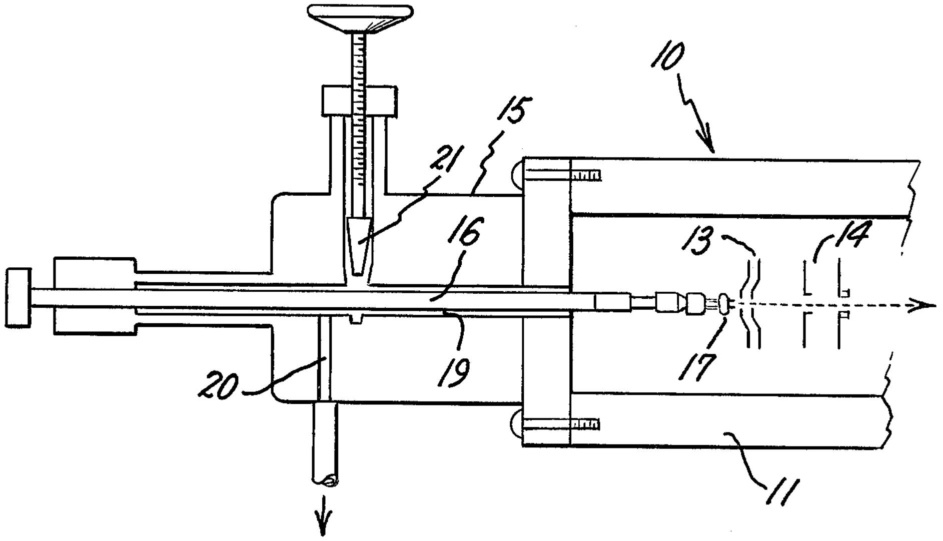
FIG. 1 is a longitudinal sectional view of mass spectrometer field desorption apparatus embodying this invention in preferred form in assembly with a mass spectrometer analyzer, shown fragmentarily.

As shown in FIG. 1, this invention apparatus is used in association with a mass spectrometer to provide the positive ion beam which delivers the ion species of the sample to be analyzed into the optical system of the mass spectrometer. The associated elements of this apparatus, therefore, include mass spectrometer 10 having a field desorption apparatus receiving structure 11, a cathode plate 13 and beam alignment structure 14 secured in position within desorption apparatus receiving structure 11. An ion source assembly 15 is bolted to the open end of receiving structure 11 so that field emitter insertion rod 16 of the assembly extends into the mass spectrometer and field ion emitter carrier 17 affixed to the leading end of rod 16 is in operative position adjacent to cathode plate 13. Rod 16 is axially adjustable as it extends through central passageway 19 of ion source assembly 15 which communicates through port 20 with a vacuum source (not shown) for evacuating the mass spectrometer when assembly 15 and rod 16 are in the positions illustrated in FIG. 1. Vacuum lock valve 21 of assembly 15 is operable to close passageway 19 when rod 16 is retracted for sample loading or other purpose.

Figure 2:
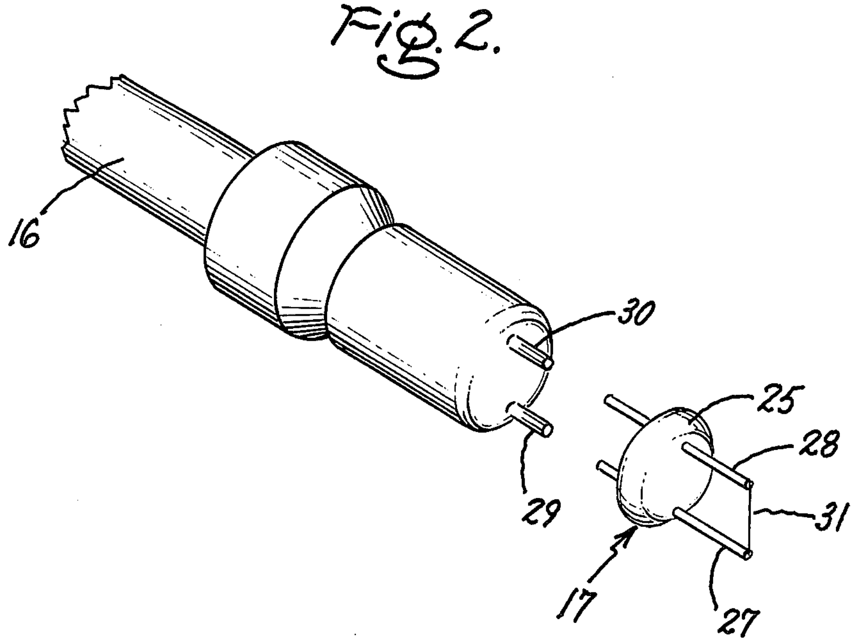
FIG. 2 is an enlarged, fragmentary, perspective view of the end portion of the field emitter insertion rod of the apparatus of FIG. 1, showing the field ion emitter carrier in position for normal attachment to the rod.
Figure 3:
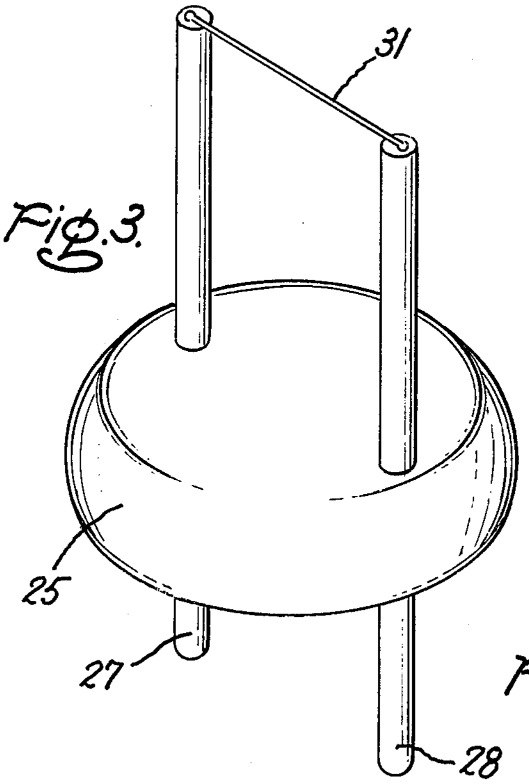
FIG. 3 is an enlarged perspective view of a field ion emitter carrier and anode of this invention suitable for use in the apparatus of FIG. 1.
Figure 4:
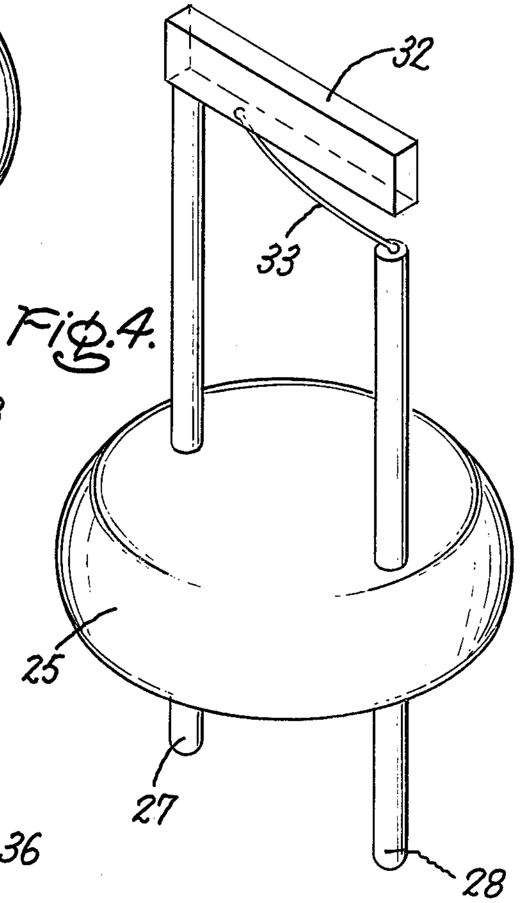
FIG. 4 is a view similar to that of FIG. 3 of another field ion emitter and anode embodying this invention in preferred form.

As shown in FIG. 2, emitter carrier 17 comprises a base 25 of suitable ceramic material in the form of a disc with two electrodes 27 and 28 secured to and extending through the disc for telescopic engagement with electrodes 29 and 30 projecting from the leading end of insertion rod 16 and for attachment at their other ends to a field anode wire, as illustrated in FIGS. 3 and 4. Electrical leads (not shown) connect the carrier with an external power source (also not shown) through insertion rod 15.

Figure 5:
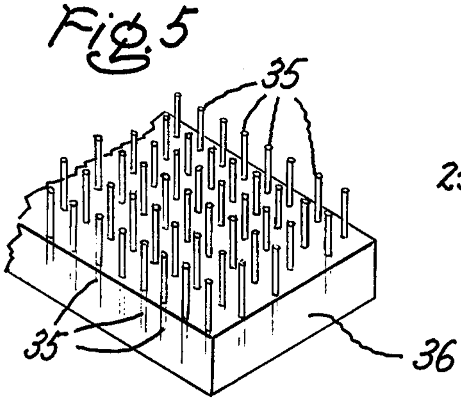
FIG. 5 is a drawing illustrating in magnified form a transverse cross section of the wire comprising the field anode of FIG. 4, showing the second phase rods which provide the emitter points of the field desorption device of this invention.

As shown in FIGS. 3 and 4, directionally-solidified alloy wires 31 and 32, respectively, comprising the field anode of the apparatus may either be attached to both electrodes of the emitter carrier or may be secured only to one of them, preferably being closely spaced, however, to the other. The electrodes in each instance serve as support means in addition to providing the necessary electrical connection for the ion beam-generating action. Each of the anode wires, however, is formed in such a way that the metal matrix has projecting only from its upper surface the second phase rods forming the active points of the emitter structure. This construction and relationship is shown in FIG. 5 where it is apparent that carbide rods 35 are essentially parallel to each other within and above matrix 36 and are all of about the same exposed lengths. For maximum emission effect, these second phase rods may be tapered to relatively sharp points, suitably through the use of electrochemical etching technique.

Those skilled in the art will understand that there are a number and variety of eutectics of at least two phases in the solid state which may be employed in providing or forming the field anode wire of this invention apparatus. They will also understand that the dimensions of the wire may be selected from a fairly broad range, particularly as to cross-sectional size, and that for best results rather thicker or heavier wire should be used. In the preferred practice as illustrated in FIG. 4, this heavier section wire will necessitate auxiliary heating means for best results. Thus, according to this invention, an electrical resistance wire 40 (suitably of nichrome) is connected to anode wire 32 and to electrode 28 so that wire 32 can be maintained at an elevated temperature as required during the period of operation of the field desorption device.

Figure 6:
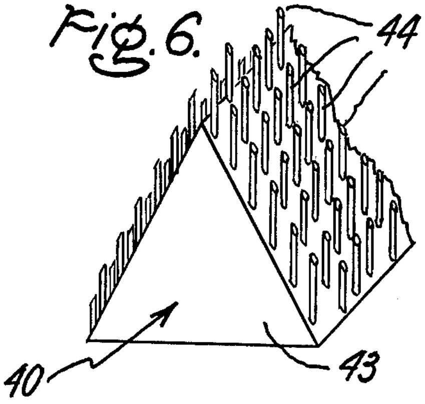
FIG. 6 is a view similar to that of FIG. 5 of another field anode of this invention.
Figure 7:
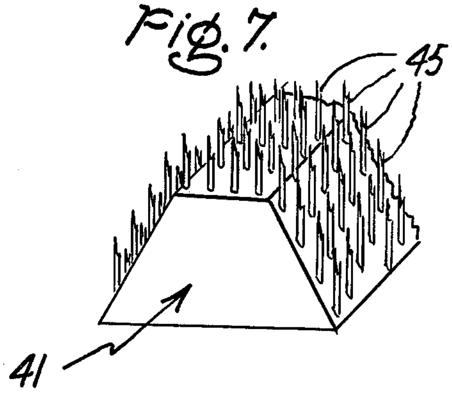
FIG. 7 is another view like that of FIG. 5 of still another field anode of this invention.

Preferred eutectic alloys include Ni-TaC, Ni-W and NiAl-Cr. Further, whether these or other similar alloy materials are used, it will be understood that satisfactory results can be obtained by melting the alloy components together to produce a uniform molten mass which is then cast and directionally solidified so that the rod-like second phase in the finished casting is in the form illustrated in FIG. 5. The individual rods will be of the dimensions described above, depending upon the solidification rate and composition of the material of the melt, and likewise the volume fraction of the rods in the casting will be dependent upon the history of the production operation and particularly the composition of the melt. The rod may, however, take various other cross-sectional shapes as indicated in FIGS. 6 and 7.

The resulting directionally-solidified alloy ingot is cut to provide a wire of approximately the desired dimensions, which is then machined to cross-sectional shape and finished to size by a polishing operation. The upper portion of the wire is exposed to contact with a suitable etchant solution, the matrix being thus removed so that the second phase rods project to the desired extent, such as about 20 microns, as shown in FIG. 5. If pointing of the rods is desired, that can be accomplished with an electrochemical etching bath. In alternative practices of this invention illustrated in FIGS. 6 and 7, field anode wires 40 and 41, respectively, are shaped to maximize ion beam output. Thus, not only are the rods pointed in each instance but the wire itself is shaped with a top edge or truncated edge, i.e., the wires are triangular (wire 40) and trapezoidal (wire 41) in cross section.

According to our invention, wire 40 is formed by the procedure described above except that the knife edge is formed prior to the etching step with the result that as the metal of matrix 43 is etched away, rods 44 exposed on either side of the knife edge have tops tapered to the angle of the matrix slope. Wire 41 is similarly produced except that in accordance with our present novel method the wire after the etching step is subjected to ultrasonic shock waves which break off all the exposed rods leaving jagged stubs. This step is suitably carried out through the use of a Bronsonic Ultrasonic Cleaner (Bronson Instruments Company). A second etching step is thereafter carried out to expose additional portions of rods 45, preferably again approximately 20 microns of length.

The following illustrative, but not limiting, examples of the practice of this invention as it has been or may be carried out, will serve to further inform those skilled in the art regarding the essential novel features defined in the appended claims:

EXAMPLE I

Using a Varian-MAT 731 mass spectrometer, we tested an emitter made by forming a wire of Ni-TaC eutectic material of dimensions approximating 60 micrometers (μm) width, 40 μm depth, and 6 μm length. This element then was wire 31 illustrated in FIG. 3 and it was spot-welded at its ends to electrodes of the emitter carrier with its tantalum carbide rods extending upwardly and with their long axes substantially parallel to each other and aligned with the optical path of the mass spectrometer when the emitter carrier was positioned in the receiving structure of the mass spectrometer. This apparatus proved to have a sensitivity for acetone in the field ionization mode of $1 \times 10^{-7}$ Amperes per torr (A/torr). The emitter produced a steady ion current and was relatively insensitive to arc damage, experiencing arcing 10 to 15 times before failure. By comparison, single arcs will frequently destroy the best carbon dendrite emitters of the prior art and in a parallel test using acetone a representative carbon dendrite emitter had sensitivity of $5 \times 10^{-8}$ A/torr. The sensitivity of the emitter of this invention was also measured for cholesterol against that of a carbon dendrite emitter with the result that the former was found to be $1.64 \times 10^{-13}$ Coulombs per microgram (C/μg) while the figure of merit of the latter is $6\times 10^{-12}$ C/μg. The specification for the MAT-731 mass spectrometer (for cholesterol) using a carbon dendrite emitter is $1 \times 10^{-12}$ C/μg.

EXAMPLE II

Field anode wire 32 of Ni-TaC or other suitable eutectic alloy may be similarly used in tests against the best field anodes of the prior art with the expectation that even greater superiority will be shown in favor of the field desorption devices of our present invention. In this instance, wire 32 would be mounted on the carrier as shown in FIG. 4 and nichrome wire 33 is attached directly to the wire so that as the heater wire quickly reaches red heat stage at the outset of the field desorption operation, wire 32 is heated mainly by heat conduction to favorable operating temperature. The larger active surface of wire 32 offers the advantage of repeated reuse through re-etching to expose additional increments of length of the tantalum carbide or other second phase rods. It also holds out the possibility that the rods may be sharpened for special advantage as described above and noted in Example III.

EXAMPLE III

Following the procedure set out in Example I, wire 41 of Ni-TaC or other suitable eutectic alloy can be similarly tested against emitters of the prior art including those of the carbon dendrite type used in routine mass spectrometry applications, with the reasonable expectation that the new results and advantages stated above will be consistently obtained and realized. Again, as in Example II, the field anode wire will preferably be mounted on the field emitter carrier as shown in FIG. 5 and a suitable resistance heater wire of nichrome, tungsten or the like will be provided in direct contact at one end with wire 41 and attached at the other end to one of the electrodes 27 and 28.

What we claim as new and desire to secure by Letters Patent of the United States is:

1. In a field desorption device useful in mass spectrometry including a field emitter insertion rod, a field ion emitter carrier affixed to an end of the insertion rod and comprising a base and two spaced electrodes projecting from the base, and conductor means to connect the carrier with an electric power source, the combination of a field anode in the form of directionally-solidified eutectic alloy wire bridging between and electrically coupled to one of the free ends of the emitter electrodes, said wire consisting of a metal matrix and a second phase in the form of substantially parallel rods in the matrix and projecting a substantially uniform distance from the matrix surface away from the carrier base, said rods being of substantially uniform diameter from 1,000 Angstroms to 10 microns and of population density from $10^9$ to $10^5$ rods per square centimeter.

2. The combination of claim 1, in which the wire is physically attached to and electrically coupled to the free ends of both the emitter electrodes.

3. The combination of claim 1, in which an electrical resistance wire heater is supported by the electrodes in proximity to the said eutectic alloy wire to indirectly heat the field anode during operation of the field desorption device.

4. The combination of claim 1, in which the wire constituting the field anode consists of a cast alloy selected from the group consisting of nickel-tungsten and nickel-aluminum-chromium consisting of eutectic composition or within ten per cent of eutectic composition which in the cast state consists of at least two phases.

5. The combination of claim 1, in which the field anode consists of a cast alloy nickel-tantalum carbide.

6. The combination of claim 1, in which the alloy wire cross section is about two square millimeters and the wire is secured at one end to an electrode of the emitter carrier while its other end portion is situated in close proximity to the other carrier electrode.

7. The combination of claim 5, in which the second phase consists of metal carbide and in which an electrical resistance heater wire is connected at one end directly to the field anode and at the other end to an electrode of the emitter carrier.

8. The combination of claim 1 in which the field anode wire is triangular in cross section and the second phase rods along two upwardly facing sides of the wire are tapered so that the planes of their top surfaces are approximately parallel to the planes of the sides of the wire from which the respective rods project.

9. The combination of claim 1 in which the field anode wire is trapezoidal in cross section and the second phase rods along two upwardly facing sides of the wire are tapered at their tops.

10. The method of producing a field anode for use in a field desorption device which comprises the steps of providing a directionally solidified alloy eutectic wire having upper and lower surfaces comprising a metal matrix and a second phase in the form of substantially parallel rods in the matrix, selectively removing a portion of the matrix metal from the upper surface of the wire to expose part of the length of said rods, exposing the resulting wire to ultrasonic shock waves and thereby breaking off the rods to leave jagged stubs projecting from the upper surface of the wire, and finally again selectively removing a portion of the metal matrix from the upper surface of the wire to expose an additional increment of length of each rod.

* * * * *